(12) United States Patent
Mason et al.

(10) Patent No.: US 6,406,230 B1
(45) Date of Patent: Jun. 18, 2002

(54) TENSIONING APPARATUS

(75) Inventors: Stuart Leslie Mason; John Chatterley Perring; Cecil Norman Unwin, all of Somerset (GB)

(73) Assignee: C. N. Unwin Limited, Somerset (GB)

( * ) Notice: Subject to any disclaimer, the term of this patent is extended or adjusted under 35 U.S.C. 154(b) by 0 days.

(21) Appl. No.: 09/530,770
(22) PCT Filed: Nov. 2, 1998
(86) PCT No.: PCT/GB98/03279
§ 371 (c)(1), (2), (4) Date: May 4, 2000
(87) PCT Pub. No.: WO99/22959
PCT Pub. Date: May 14, 1999

(30) Foreign Application Priority Data

Nov. 4, 1997 (GB) ............................................. 9723166

(51) Int. Cl.[7] ................................................. B60P 7/08
(52) U.S. Cl. .................. 410/7; 410/4; 410/12; 410/100
(58) Field of Search .................. 410/2, 3, 4, 7, 410/9, 10, 11, 12, 23, 100; 254/214, 222, 228, 291, 361; 296/65.04; 24/265 CD, 68 CD

(56) References Cited

U.S. PATENT DOCUMENTS

| 2,830,783 | A | | 4/1958 | Halvarson |
| 4,054,267 | A | | 10/1977 | Berg et al. |
| 4,243,350 | A | | 1/1981 | Hall ............................ 410/100 |
| 4,623,289 | A | * | 11/1986 | Apostolos ....................... 410/7 |
| 4,995,776 | A | * | 2/1991 | Kato ........................... 410/100 |
| 5,026,225 | A | * | 6/1991 | McIntyre ....................... 410/23 |
| 5,145,299 | A | | 9/1992 | Stephenson, Jr. ............ 410/100 |
| 5,288,187 | A | * | 2/1994 | Ward ........................... 410/100 |
| 5,489,170 | A | * | 2/1996 | Inoue et al. .................... 410/7 |
| 5,567,095 | A | * | 10/1996 | James et al. .................... 410/7 |
| 5,762,455 | A | * | 6/1998 | Long ........................... 410/100 |
| 5,888,038 | A | * | 3/1999 | Ditch et al. ..................... 410/7 |
| 6,113,325 | A | * | 9/2000 | Craft ............................. 410/7 |

FOREIGN PATENT DOCUMENTS

| EP | 0 214 838 | 3/1987 |
| NL | 9 201 844 | 4/1994 |

\* cited by examiner

Primary Examiner—Stephen T. Gordon
(74) Attorney, Agent, or Firm—Young & Thompson

(57) ABSTRACT

A belt (3) can be pulled out from a spring biased retractor reel (2) when a ratchet mechanism (16) is released. The belt (3) is entrained around a movable shoe (4) before being led to a fastening point. When fastened, the spring bias in the reel (2) takes up the slack. Operation of an actuator, such as by depression of a pedal (10), first causes the ratchet mechanism (16) to engage and then shifts the shoe (4) to stretch and tension the belt between the reel (2) and the fastening point. The pedal (10) is retainable in its fully depressed, belt-tensioning position.

10 Claims, 2 Drawing Sheets

TENSIONING APPARATUS

This invention relates to tensioning apparatus. It was developed for dual purpose seat structures such as that described in our Patent GB-B-2197628, but it has wider applications.

According to the present invention there is provided tensioning apparatus for a flexible tie that can be pulled out from a spring biased retractor reel when a locking mechanism associated therewith is disengaged, the apparatus comprising an actuator which co-operates with the reel locking mechanism and which has an element around which the tie is entrained, wherein, at a start position of the actuator, the locking mechanism is held disengaged thereby and the tie is withdrawable from the reel to be attached to a workpiece, any slack being taken up by the reel spring, wherein initial movement of the actuator from the start position causes the locking mechanism to engage and wherein further movement of the actuator to a stable finish position tensions the tie.

Usually, the tie will be a belt. For many applications, the actuator will include a pedal, raised in the start position and depressed in the finish position. But the actuator could be powered.

The actuator may include a linkage whose configuration at the finish position gives the actuator its stability at that position.

In addition, or alternatively, there can be a locking device arranged to engage the actuator automatically as it reaches the finish position. This locking device may have a remote release control, particularly if the actuator is a pedal.

A common actuator could govern more than one reel, and this is particularly applicable to wheelchair restraints. Two ties can have hooks to engage low down at the rear or wheelchair frame, and when tensioned the wheelchair will be pulled back firmly against an abutment substantially above axle height of its rear wheels.

For a better understanding of the invention, one embodiment will now be described, by way of example, with reference to the accompanying drawings, in which.

Figure 1:
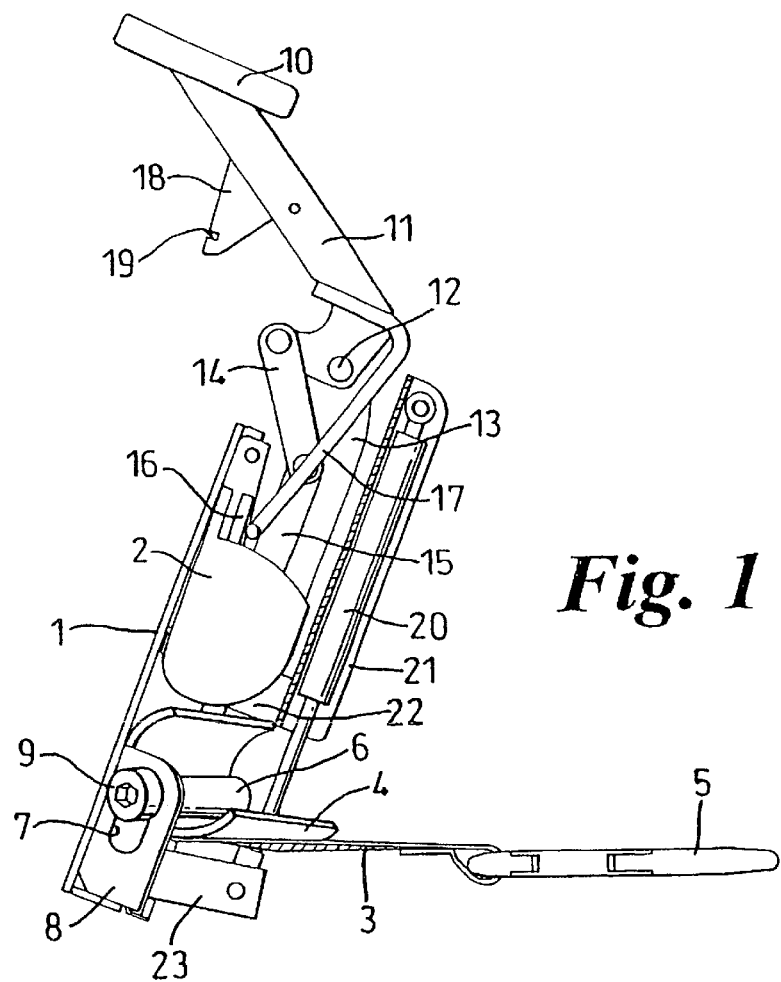
FIG. 1 is a side view of a tensioning mechanism before use.

An inclined plate 1 carries two spring biased ratchet reels 2 on the underside from which belts 3 can be pulled once the ratchets are released. The springs tend to retract the belts, which are rove around part-cylindrical guide elements or shoes 4 in a shallow V arrangement and then lead away from the plate and slightly outwardly. They carry hooks at their free ends which can be engaged around frame members of a wheelchair, for example, low down and to the rear. The shoes 4 can be part of a device for tensioning the belts 3 when the wheelchair is hooked on and backed against an abutment above the plate 1.

The shoes 4 are welded internally to a V-shaped bar 6 whose ends project through slots 7 in flanges 8 at the bottom of the side edges of the plate 1. The slots 7 are parallel to these edges, and outside the flanges 8 the bar 6 has enlargements 9 fitted to keep the shoes 4 symmetrically positioned. When the belts 3 are hooked on to a wheelchair backed up against the abutment, the retractor reels 2 take up the slack while the shoes 4 are in the raised position of FIG. 1. Extra tension is then applied to the belts by forcing the shoes 4 down to the FIG. 2 position, the belts 3 being held against extension.

Figure 2:
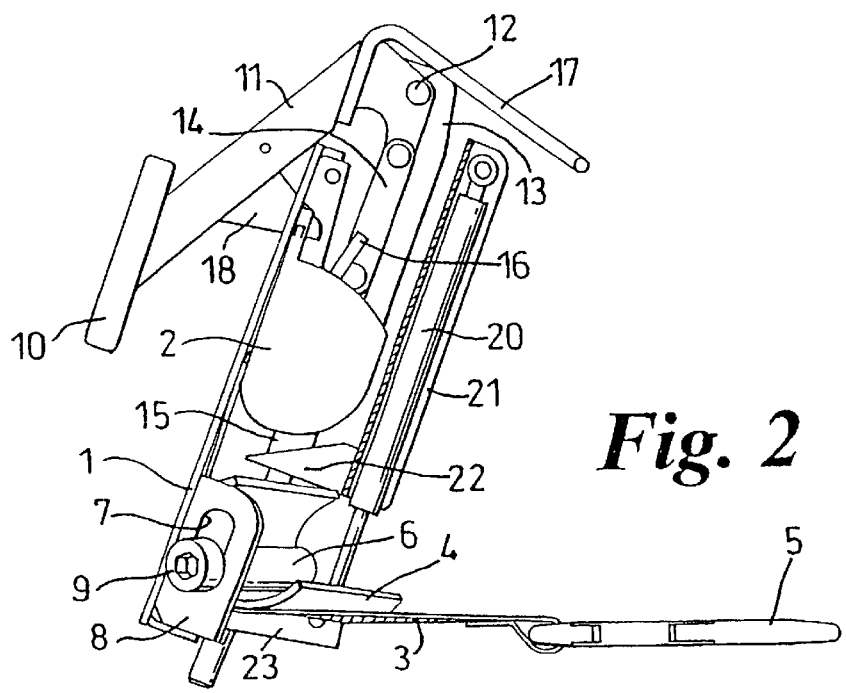
FIG. 2 is aside view of the mechanism in use.
Figure 3:
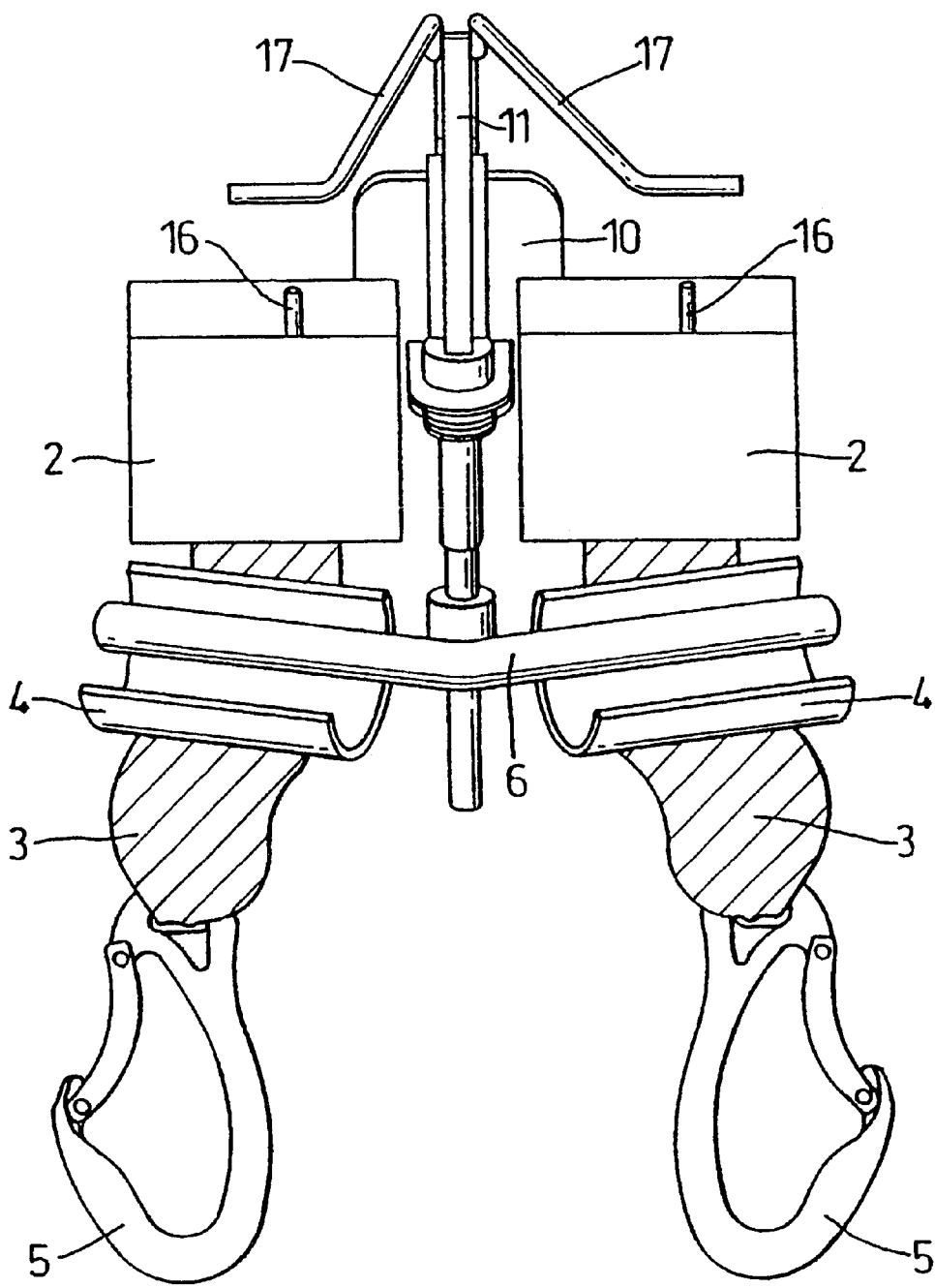
FIG. 3 is a forward view of part of the mechanism.

This is done by a pedal 10 at the end of a J-shaped arm 11 projecting to the rear of the plate 1 and pivoted at 12 to a bracket 13 on the underside and extending above the plate 1. The transverse pivot axis 12 is at the turn of the J and a pivoted link 14 couples the toe of the J to a rod 15 constrained to move up and down parallel to the plate 1. The rod 15 carries the bar 6, being fixed to its vertex. In the raised position of the pedal 10, the link 14 makes a zig-zag connection between the rod 15 and the toe of the J-arm 11, as seen in FIG. 1, but when the pedal 10 is depressed, the coupling straightens up, forcing the rod 15 down as seen in FIG. 2. The alignment of the pivot axes means that the pedal 10 will remain depressed even when pressure on it is removed, although the stability is somewhat fragile. It can be made more positive by arranging for the pedal to swing down a little further to a limiting position, bringing the joint between the arm 11 and the link 14 just beyond the position shown in an over-centre action.

The reels 2 each have a locking mechanism or latch operated by an upwardly projecting pin 16. In one position, pushed back towards the plate 1, the latch is off, disengaging the reel and allowing the belt 3 to be pulled out against the spring. It is in this condition that a wheel-chair is initially made captive. But when the pin 16 moves away from the plate 1, as it will tend to do under the influence of a spring (not shown) the latch is engaged and the belt is prevented from extending. This latch operation is controlled by the pedal 10, the arm 11 carrying at each side shaped actuator bars 17 which co-operate with the pins 16. With the pedal 10 raised, the bars 17 hold the latches off, allowing the belts to be pulled out, but as soon as the pedal is depressed the pins 16 are released to the locking position holding the belts against extension.

It may not be considered safe to rely on the configuration of the linkage to keep the pedal 10 depressed. If knocked, there could accidental release, and so further measures are preferred. In this embodiment, the arm 11 carries a projection 18 on its underside with a notch 19, and this projection can penetrate an aperture in the plate 1 for the notch 19 to be engaged by a catch (not shown) between the reels 2. This catch is preferably automatic in snapping into the notch 19 as the pedal reaches its lowermost point, and it may be released by a remote control through a Bowden cable.

Once released, the pedal should conveniently rise automatically to the FIG. 1 position. This could be done by mechanical spring means, but it is preferred here to use a gas spring 20. This is parallel to the rod 15 and is housed in a channel member 21 carried by a bracket 22 projecting away from the plate 1 from the lower end of the rod 15. The upper end of the gas spring 20 is fixed to the channel member 21 while its lower end is coupled to a fixed bracket 23 projecting from the lower end of the plate 1. In the pedal-up position of FIG. 1 the gas spring 20 is extended, but as the pedal 10 is depressed it is forced to contract, storing up energy to raise the pedal again once that is released.

The example described above is operated by foot, apart from the possible remote control release. It will be understood that it could be adapted to be operated entirely by hand, and that there could be a powered actuator, electrical, hydraulic or pneumatic for example, for the shoes 4 and fingers 17. This would enable the tension. mechanism (or several of them) to be remotely controlled, such as by the driver of a vehicle equipped with wheelchair restraints.

What is claimed is:

1. Tensionable flexible tie apparatus comprising:
   a flexible tie,
   a spring biased retractor reel on which the tie is wound and from which the tie can be withdrawn against the spring bias, a deviation element around which the withdrawn tie is entrained on its route to attachment to a workpiece, a locking mechanism for the reel which, when engaged, prevents the tie being withdrawn from the reel and which, when disengaged, allows the tie to be withdrawn from the reel, an actuator movable from a start position to a stable finish position to determine the condition of the locking mechanism and simultaneously to move the deviation element to lengthen the route of the tie between the reel and the workpiece and thereby progressively tension the tie, the locking mechanism being disengaged when the actuator is at its start position with the deviation element minimizing the route of the tie between the reel and the workpiece, and the locking mechanism being engaged whenever the actuator is not at its start position.

2. Tensioning apparatus as claimed in claim 1, characterised in that the tie is a belt (3).

3. Tensioning apparatus as claimed in claim 1, characterized in that the actuator (11) includes a pedal (10), raised in the start position and depressed in the finish position.

4. Tensioning apparatus as claimed in claim 1, characterised in that the actuator is powered.

5. Tensioning apparatus as claimed in claim 1, characterised in that the actuator (11) includes a linkage (14, 15) whose configuration at the finish position gives the actuator its stability at that position.

6. Tensioning apparatus as claimed in claim 1, characterised in that a locking device (19) is provided to hold the actuator (11) in the finish position.

7. Tensioning apparatus as claimed in claim 6, characterised in that the locking device (19) is arranged to engage the actuator (11) automatically as it reaches the finish position.

8. Tensioning apparatus as claimed in claim 6, characterised in that the locking device (19) has a remote release control.

9. Tensioning apparatus as claimed in claim 1, wherein there is at least a second reel, each reel having an associated flexible tie, locking mechanism and deviation elements, and wherein the actuator operates all the locking mechanisms and deviation elements simultaneously in a similar manner.

10. A wheelchair restraint including tensioning apparatus as claimed in claim 9, and an abutment above the tensioning apparatus towards the underside of which the ties pull when extended with the locking mechanism disengaged, the ties having hooks for engaging the frame of a wheelchair, which is braced against the abutment when the ties engaged with the frame are tensioned.

* * * * *